United States Patent [19]

Mouille et al.

[11] Patent Number: 4,556,365

[45] Date of Patent: Dec. 3, 1985

[54] HUB PLATE FOR A HELICOPTER ROTOR, METHOD OF MANUFACTURING IT, AND A HELICOPTER ROTOR HUB EQUIPPED WITH PLATES

[75] Inventors: René L. Mouille, Le Coton Rouge; Jean-Luc M. Leman, Aix-en-Provence, both of France

[73] Assignee: Societe Nationale Industrielle et Aerospatiale, Paris, France

[21] Appl. No.: 512,002

[22] Filed: Jul. 8, 1983

[30] Foreign Application Priority Data

Jul. 8, 1982 [FR] France .................................. 82 11988

[51] Int. Cl.⁴ .............................................. B64C 27/38
[52] U.S. Cl. .................................. 416/134 A; 416/230; 416/244 R
[58] Field of Search .......... 416/134 A, 138 A, 140 A, 416/141, 230 A, 244 D

[56] References Cited

U.S. PATENT DOCUMENTS

| | | | |
|---|---|---|---|
| 4,096,012 | 6/1978 | Belko et al. ........................ | 156/214 |
| 4,156,583 | 5/1979 | Mayerjak ........................... | 416/208 |
| 4,195,967 | 4/1980 | Weiland ............................. | 416/134 A |
| 4,293,276 | 10/1981 | Brogdon et al. ................... | 416/134 A |
| 4,321,013 | 3/1982 | Schwarz et al. .................. | 416/244 R |
| 4,386,989 | 6/1983 | Aubry ................................. | 156/182 |
| 4,425,082 | 1/1984 | Mussi .................................. | 416/61 |

FOREIGN PATENT DOCUMENTS

| | | |
|---|---|---|
| 2745468 | 4/1979 | Fed. Rep. of Germany . |
| 3037824 | 5/1982 | Fed. Rep. of Germany ... 416/230 A |
| 2156182 | 5/1973 | France . |
| 2369158 | 5/1978 | France . |
| 2392875 | 12/1978 | France . |
| 2447856 | 8/1980 | France . |
| 2454963 | 11/1980 | France . |

Primary Examiner—Everette A. Powell, Jr.
Attorney, Agent, or Firm—Armstrong, Nikaido, Marmelstein & Kubovcik

[57] ABSTRACT

A hub plate and helicopter rotor incorporating same made of a composite material and comprising a laminated disc constituted by layers of fiber cloth having high mechanical strength. A frame of the disc is made of aligned layers of the cloth with the weft or warp of the cloth extending radially in the direction corresponding to the direction of centrifugal force acting on the plate when in use. The aligned layers are positioned at the core of the structure and at least at the surface of the structure in the peripheral portion of the disc. The disc is enclosed by a belt of parallel threads consisting of fibers having high mechanical strength fitted on radially outwardly projecting parts of the disc in recesses formed in the outer edge of the parts, the recesses being open to the exterior.

21 Claims, 11 Drawing Figures

HUB PLATE FOR A HELICOPTER ROTOR, METHOD OF MANUFACTURING IT, AND A HELICOPTER ROTOR HUB EQUIPPED WITH PLATES

The present invention relates to a plate designed in particular for the fitting of a helicopter rotor hub, a method of manufacturing such a plate, as well as helicopter rotor hub provided with at least one such plate.

A plate of the kind with which the invention is concerned is intended to be secured to the top portion of a rotor shaft substantially perpendicularly to the axis of rotation of the latter so as to connect the rotor blades to the rotor shaft and is made of a composite material comprising a laminated disc constituted by layers of woven cloth having high mechanical strength.

A helicopter rotor hub, comprising two plates of this kind, is described in French Patent No. 2 392 875. In this patent, the central part of the rotor head or hub is a one-piece body of composite fibre material, which body is formed by bonding the two discs or plates which can be placed one upon the other and enclose an intermediate coaxial part. The plates are star-shaped and are arranged coaxially with, located between them, a spacing part which is in one piece or divided into elements fitted in the zones between the arms of the star-shaped plates. The entire hub of composite fibre material is constituted, for example, by glass fibre embedded in a synthetic resin in such a way that the fibres extend without a break from the tip of one limb of a plate to the tip of the diametrically opposed limb since the hub described in this patent is intended to be used for a rotor comprising an even number of blades. The three parts constituting the hub, i.e. the two plates and the coaxial intermediate part, can be produced by the manual lamination of several fibre-cloth layers or mats and they can be assembled while still not completely hardened, i.e. in the pre-hardened condition, after which they are brought together under pressure and completely hardened. For the purpose of producing the hub, this patent, however, also envisages other methods such as the winding of laminations under pressure or a mechanical winding process, by means of which the hub can be manufactured in a single operation.

Certificate of Addition No. 2 454 963 associated with the above-mentioned French patent, states that when the flat plates of a hub of the above kind are produced in the usual manner by the lamination of the layers of glass-fibre cloth, impregnated with a synthetic resin and cut to the shape of a star, there arises a problem as regards strength, and the laminated cloth structure sets limits to the use of the hub which can be used only in connection with rotors intended for operation at low speeds of rotation.

In order to overcome this major drawback, the above-mentioned Certificate of Addition describes a hub, in which each of the two plates consists of a number of layers corresponding to the number of pairs of rotor blades, each layer being formed by at least one loop of fibres extending uninterruptedly between a pair of rotor blades, that is to say from the outer radial end of a limb of the star to the diametrically opposite outer radial end of the opposite limb. For each pair of rotor blades, each plate comprises at least two fibre loop sections arranged one after the other between one pair or the other pairs of blades and separated by the first loop, the fibre loop of each layer being arranged above and/or below a pair of fibre loop sections, extending in the same direction, of a lower and/or upper layer, there being disposed, between two successive layers, an intermediate layer in which the fibres cross each other and which is designed to connect fibre loops and sections of fibre loops.

For each layer comprising at least one loop of endless fibres, there are provided, in the lengthwise direction of a pair of diametrically opposite blades, as many loops of endless fibres, extending to the centre of the layer, and arranged side by side, as there are connecting apertures in each of the outer radial ends of the corresponding diametrically opposed limbs of the star-shaped plate; furthermore, there is provided, also in the lengthwise direction of each of the other diametrically opposite pairs of blades, a number of pairs of fibre loop sections (arranged, in the case of each pair, on each side of the continuous fibre loops in the central portion of the layer) that equals the number of connecting apertures. The intermediate layers and any layers that may be provided for covering the laminated structure are constituted by a cloth laminate, as well as the portions of each layer that are surrounded either by the loops or by the sections of fibre loops and the filler parts, certain of which are each arranged between that portion of a fibre loop extending along one limb of the star and the section of the fibre loop near an adjacent limb of the star, while others are arranged between the loop sections and the loops, or between the outer radial ends of the loops and the outer radial end of the corresponding limb.

Each plate is therefore not homogeneous, since many layers forming the laminated structure are constituted by the association of loops and sections of fibre loops directed in such a way that they are particularly well suited to absorb and transmit the centrifugal force of the blades, and of filler pieces arranged inside and outside the loops and loop sections and which contribute to a large extent to the bending strength of the plate.

It will be known that a hub plate must, to a large extent, perform three functions:
  the take-up of the centrifugal force,
  the transmission, to the rotor shaft, of the shear loads resulting from the effects of lift on the blades and from different moments resulting from the movements of the blades, and
  the transmission of the torque of the rotor shaft to the blades.

If it is wished that the loops and the sections of fibre loops play their roles in a suitable manner by taking up the main part of the centrifugal force, and that the filler pieces perform their function of partially transmitting the torque and the main part of the shear loads, it appears necessary firstly to rigidize the loop sections in the direction in which centrifugal force is applied, this being achieved by increasing their cross-section, and secondly to render the cloth layers of the filler parts flexible in the direction in which the centrifugal force acts and to stiffen them to withstand the flapping, this being achievable by arranging the cloth layers so that they extend in different directions.

However, it is then found that the association, within the same layers, of elements bonded to each other and required to meet contradictory requirements by resisting different kinds of stress, results in the separation of laminae occurring at the interface of the cloth loops and sections of fibre loops.

French Patent Nos. 2 156 182 and 2 369 158, in particular, have already proposed the use, in helicopter rotors, of belts, strips or bandages consisting of unidirectional fibres, of glass for example, which are agglomerated and embedded in a plastics material so as to absorb, under certain conditions, the centrifugal forces which are applied to certain components of these rotors.

French Patent No. 2 156 182 relates to a hub having a central connecting body to which are solidly connected blade-support sleeves which extend radially and are of a number equal to that of the blades of the rotor, and in each of the blades is fitted a propeller end which is attached to the central connecting element by a cluster of torsionally resilient draw members. This cluster, which may be a limb of a star-shaped cluster, lies in a plane which is substantially the plane in which the rotor turns. In this patent, mention is made of two different types of bandages designed to absorb the centrifugal forces in the event of cracks forming in stressed members so that survival of the helicopter is ensured; the first type of bandage is laid around the central connecting element and is supported by a pin on a sleeve fitted around the base of the blade and not directly on the latter. On the other hand, a second type of bandage is laid around each connecting pin of the base of the blade on the corresponding sleeve. In fact, the hub disclosed in this French Patent No. 2 156 182 is not a hub comprising two plates, and there is no plate connecting the base of the blade to the hub and constituted by a laminated disc formed by laminated layers of fibre glass impregnated with resins. Although the hub according to this French Patent No. 2 156 182 may comprise an element of substantially the same shape as the plate according to the present invention, that element is not a plate secured to a central hub element connected to the rotor shaft, but a central connecting element, and though that element, which may not be made of metal, may have at least one connection aperture, through which a pin is intended to pass, its function is to provide a connection, not to the base of a blade, but to the radially inner end of the cluster of torsionally flexible pieces.

French Patent No. 2 369 158 does, in fact concern a hub comprising upper and lower discs, but the base of each blade is solidly connected to a support longeron mounted to rotate in an inner and outer radial bearing both fitted between the two discs, each longeron being designed as a beam which resists bending and is made of a composite fibre material, this beam furthermore comprising portions reinforced with bands consisting of two bundles of fibres extending only in the longitudinal direction, in the form of a loop, the two branches of which are separated by a shear panel consisting of a cloth comprising fibres crossing at an angle of 45°. The inner bearing takes the form of a fitted piece which, by way of a bearing element, transmits the transverse and centrifugal forces to a shaped piece secured between the upper and lower discs, and the centrifugal forces are compensated by looped elements which interconnect all the shaped pieces and thus effect direct compensation of the centrifugal forces of all the rotor blades without the hub undergoing stress from these forces. The looped elements, subjected only to tensile load, are made of composite fibre material by the thread-winding method and each of them consists of two bundles of fibres, the elastic moduli of which differ greatly while their rigidity is roughly the same, for example, an inner bundle of fibre-glass plastic material and an outer bundle of carbob-fibre plastic material. The two looped bundles are thus such that each part alone takes up the full centrifugal force.

In this arrangement, in which caissons are provided for each blade between the upper and lower discs, the loops for compensating centrifugal forces are not carried at the periphery of the upper and lower discs, but around shaped pieces at the centre of the hub.

As will be apparent from the following description the general form of the hubs described in French Patent Nos. 2 156 182 and 2 369 158 is very different from that of the present invention, as is also the position of the belts or bandages for taking up centrifugal forces, these belts or bandages not cooperating with the structure of the upper and lower plates and not participating in the transmission of forces and moments between the blades and the hub.

An object of the present invention is to provide a rotor plate of the type defined above that does not suffer from the above-mentioned drawbacks and that can be subjected to heavy stresses, this plate being required to be suitable for use with the main rotors of high-speed helicopters wherein the rotors are subjected to forces and bending and torsional moments of high values, the plate also requiring to be easy to produce while at the same time having a low weight and cost, without its reliability being reduced.

For this purpose, a plate according to the invention is characterized in that the laminated disc, constituted by superposed layers of fibre cloth of high mechanical strength, comprises a frame constituted by aligned layers of cloth which are positioned such that the weft or the warp of the cloth extends radially in the direction in which the centrifugal force acts, which aligned layers are present at the core of the laminated structure and, at least at the surface of the laminated structure, at the peripheral portion of the disc, and in that the laminated disc is enclosed by a belt of substantially parallel threads consisting of fibres having high mechanical strength.

The fibres of high mechanical strength used for forming the cloths and the belt of parallel threads may be, respectively, fibres made of the material marketed under the trade mark KEVLAR and glass fibres, but use is preferably made of a material having a high fatigue limit/density ratio, such a carbon fibre, for both the cloth and the belt of parallel threads. This ratio, which is 6.4 for steel, 4.5 for dural, and 7.8 for titanium, is, for example, 14.6 for carbon forming a cloth which, furthermore, has a low vulnerability in a laminated structure (i.e. very good fail-safe characteristics).

A plate according to the present invention is therefore not a uniform unit, but comprises two elements, one of which, positioned centrally, is a disc constituted solely by laminated layers of fibre cloth and is intended in particular to transmit, on the one hand, the torque and on the other, shear forces caused by the moments resulting from the movements of the blades and by lift, whereas the other element, consisting solely of parallel fibre threads, encloses the central disc and in particular, is intended to take up the centrifugal forces which become balanced mainly by this belt without passing to too great an extent through the central disc of the plate.

However, in a plate according to the invention, which may take the form of an element of uniform thickness, the centrifugal forces caused by rotation of the blades are divided between the two parts constituting the blades and in dependence of the thickness of each of them in the radial direction, so that a considerable proportion of the centrifugal force is absorbed by the belt of parallel threads and a not negligible part passes through the disc into the laminated cloth.

The invention permits an improvement in the distribution of the centrifugal force between the laminated cloth and the belt of parallel threads firstly by rigidizing the belt of parallel threads in the direction in which the centrifugal force acts, this being achieved by providing the belt with a sufficiently great cross-section, and secondly, by rendering the layers of cloth more flexible in the direction in which centrifugal force acts and by stiffening them to withstand the flapping, this being achieved by imparting to the laminated disc a variable thickness which is at its greatest in the central portion, and by arranging the layers of cloth of the disc in different directions.

Advantageously, the fibre cloths used are satins, the properties of which are identical in the direction of the weft and that of the warp.

In order to render the disc flexible as regards pull, crossed layers, that is to say layers wherein the weft or the warp is directed at a certain angle to the direction in which centrifugal force acts, are arranged at the heart of the laminated structure and, optionally, at the surface in the centrifugal portion of the disc and on a planar face of the latter.

Advantageously, certain of the crossed layers which are all less resistant and more flexible than the aligned layers as regards centrifugal forces, are progressively terminated with radial distance from the central portion so as to obtain the required variation in thickness of the laminated structure.

In a first advantageous form of construction, the disc, which has a central portion having a planar face and a peripheral portion having a planar face, which comprises a number of portions projecting radially towards the exterior that is equal to the number of blades that the plate is intended to connect to the rotor shaft, each of which portions having at least one aperture for connection to a corresponding blade, is such that the belt of parallel threads is pressed against the outer radial face of each of the portions, so that the belt functions correctly by absorbing the main part of the centrifugal force.

Advantageously, the disc may take the shape of a star, each limb of which constitutes a portion which projects radially outwards and is wider at the central portion of the disc than at its outer radial end, and according to an example of the invention, the spaces bounded by two adjacent limbs, the belt of parallel threads and surface coverings, each one of which is formed by at least one layer of the laminated structure, are occupied by a filler material such as a closed-cell foam substance, so that the non-operative zones correspond to thinned areas in the laminated structure formed by layers of fibre glass.

However, according to another example of the invention, the disc may have another shape, for example polygonal, with sides which are slightly rounded or domed radially towards the exterior, and of which the rounded summits constitute the radially outwardly projecting portions.

Compared with the prior art arrangements and particularly those using metallic materials, a plate according to the invention offers the advantages of considerable lightness, great resistance to notching effect, low production costs, ease of upkeep, since no maintenance is necessary, and finally, reduced space requirements, which reduces the drag of a hub provided with such plates.

The belt of parallel threads, which may be fitted at the level of the radially outwardly projecting portions in cavities formed in the end faces of these portions and open towards the exterior, is advantageously constituted by a ribbon of laminated threads impregnated with a synthetic resin, which ribbon is wound around the disc and then polymerized; however, it is also possible for the belt of parallel threads to be formed by an agglomerate of such threads impregnated with a synthetic resin, which threads will have been wound around the disc and then polymerized.

According to a second aspect of the invention there is provided a method of manufacturing a hub plate for a helicopter rotor which includes the following steps:

placing, in a mould, a stack of layers of cloth consisting of fibres having high mechanical strength, after impregnation of the cloth with a synthetic resin and cutting each layer to the required shape;

suitably compressing the stack in dependence upon the properties and qualities required in the plate;

carrying out a first polymerization cycle;

removal from the mould;

which method is characterized in that is also consists in:

winding or laying, respectively, on the end face of the stack, substantially parallel threads or a ribbon of laminated threads consisting of fibres having a high mechanical strength and previously impregnated with a synthetic resin, until a belt of parallel threads of the required thickness if formed, after possibly placing blocks of a filler material between the radially outwardly projecting parts of the stack, and in carrying out a second polymerization cycle.

A further aspect of the invention provides a helicopter rotor hub comprising at least one plate as defined above.

In a first form of construction, the hub comprises a lower plate and an upper plate which are coaxial and are separated by a crosspiece, which hub is characterized in that each of the plates is of dished form such that the central circular portion of the disc is connected to the peripheral part by at least one substantially conical portion, the cavity of which faces the other plate, each of the plates being secured by its central portion, to the cross-piece, and as regards the lower plate, to the upper end of a rotor shaft.

Advantageously, the lower plate and the upper plate, separated by a cross-piece, are plates of variable thickness each in the form of a star-shaped disc which is such that a planar face of the central portion of the disc is connected to the corresponding planar face of the peripheral portion by a tapered surface, whereas the other face of the disc is planar and the superposed limbs of the two plates each have a single aperture for connection to a corresponding blade, this aperture being provided with at least one flanged anti-friction ring designed to receive a pin for securing a connecting device to the base of the corresponding blade.

The present invention will be better understood with the help of particular forms of construction hereinafter described by way of non-limiting examples and by reference to the attached drawings in which.

Figure 1:
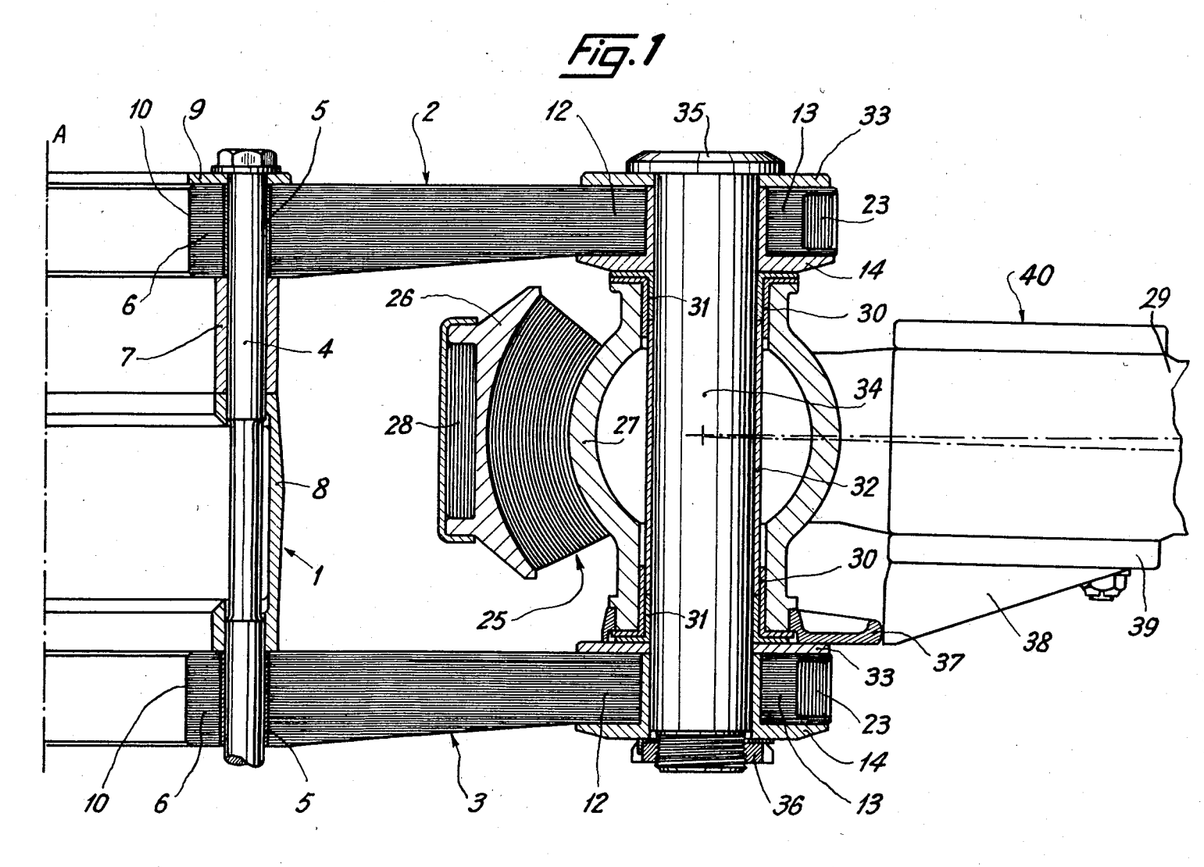
FIG. 1 is a longitudinal section through half of a first form of helicopter rotor hub, provided with two plates in accordance with a first form of construction.

The helicopter rotor hub, illustrated in FIG. 1, consists mainly of three elements which are a cross-piece 1 of generally cylindrical shape and two identical plates, one of which, the plate 2, is the upper plate, and the other plate 3 is the lower one. The two plates 2 and 3 are interconnected by a ring of bolts 4, the shank of each of which passes through a metallic drive ring 5 mounted in an aperture in the central portion 6, having upper and lower planar faces, of the upper plate 2, through a hole extending through the thickness of the wall of the upper tubular part 7 of the cross-piece 1, through aligned holes each formed in one of the inner radial edges of the upper and lower ends of a lower annular part 8 of the cross-piece 1, and through a second drive ring 5 fitted in a hole in the central portion 6, having planar upper and lower faces, of the lower plate 3. The head of the bolt 4 bears against a support ring 9, which rests on the upper face of the central portion 6 of the upper plate 2 and the central opening of which is roughly coaxial with the central opening 10 formed in the central portions 6 of the two plates 2 and 3. The support ring 9 has sixteen drilled holes aligned with the inner holes in the two rings 5 and the holes in the two parts 7 and 8 in the cross-piece 1, in such manner as to be also traversed by the stems of the bolts 4, whose lower screw-threaded ends (not shown) pass through holes drilled in a radial outer edge in the upper end (likewise not shown) of a rotor shaft on to which the bolts 4 are screwed by means of nuts for securing the hub on the rotor shaft.

Figure 2:
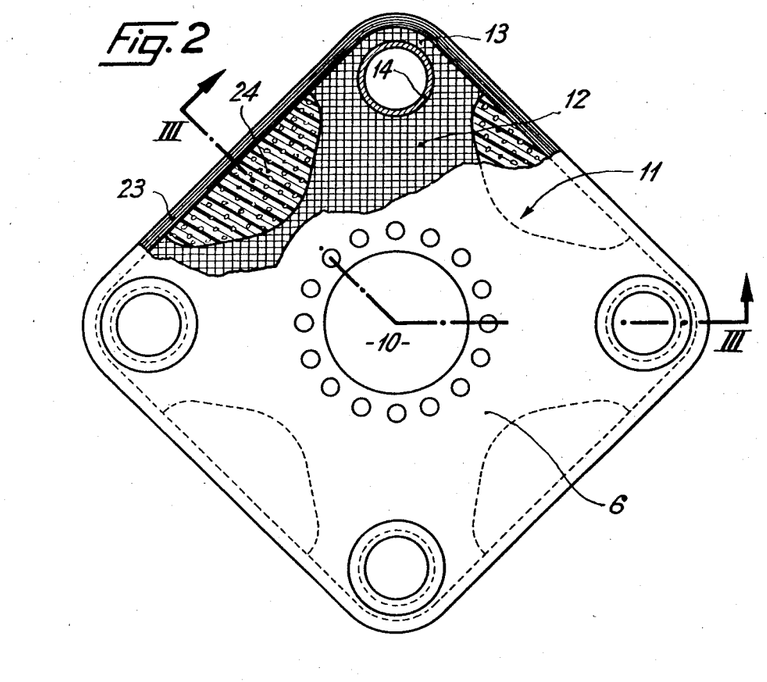
FIG. 2 is a plan view of one of the plates of the hub of FIG. 1, a portion being shown as broken off.
Figure 3:
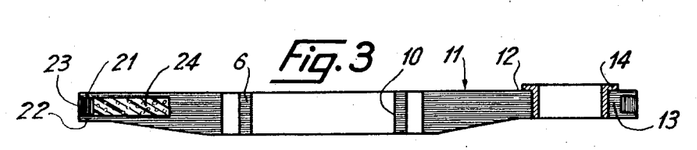
FIG. 3 is a section along the line III—III of FIG. 2.
Figure 4:
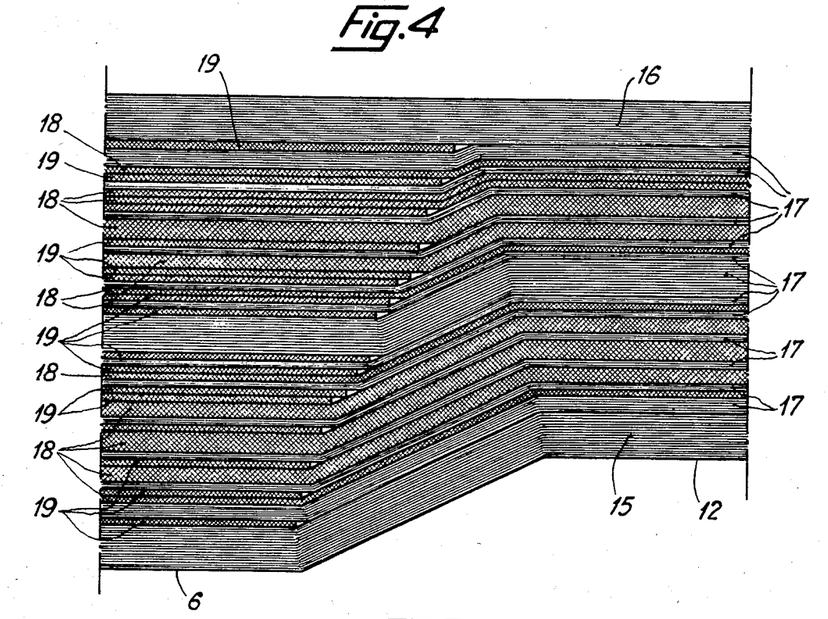
FIG. 4 shows, on a larger scale, a view of a part of FIG. 3.

Whereas the parts 7 and 8 of the cross-piece 1 and the ring 9 are metallic elements, the two plates 2 and 3 are made of a composite material. As illustrated in FIGS. 2 to 4, each plate comprises a star-shaped disc 11 having as many limbs 12 as there are rotor blades. In this example, the disc is cruciform and is suitable for use in the hub of a four-bladed rotor.

Each limb 12 is wider at the central portion 6 of the disc 11 than at its radially outer end 13 which has upper and lower planar faces and which is nevertheless widened and rounded and contains a hole in which is fitted a flanged ring 14. As shown in FIG. 3, the thickness of the disc 11 as at its greatest in its central portion 6 and at its least in its peripheral portion comprising the radially outer ends 13 of the limbs 12, and the upper face of the disc 11 is planar over its entire cross-section, whereas the lower planar face of its central portion 6 joins the lower planar face of its peripheral portion by way of a tapered surface. The disc 11 is formed by laminated layers of carbon-fibre cloth. The cloth used is a satin, having identical properties in the directions of the weft and warp. The frame of the disc 11 is formed by aligned layers of cloth, that is to say layers in which the weft or the warp of the cloth lies in the direction in which the centrifugal force acts, this corresponding to the radial direction of the limbs 12 of the disc 11. As illustrated in FIG. 4 and for the purpose of obtaining an optimum dimension of the disc 11, the aligned layers are provided at the core of the laminated structure and at the surface thereof. Two aligned layers 15 and 16 extend at the surface, one over the entire lower face of the disc and the other over its entire upper face. At the core of the stack, the aligned layers 17, whose thickness may vary from layer to layer, alternate with crossed layers or groups of crossed layers 18 and 19, i.e. layers in which the weft or warp of the cloth is directed at an angle of approximately 45° in relation to the direction in which the centrifugal force acts.

The aligned layers 15, 16 and 17 are not interrupted and they extend over the entire cross-section of the disc 11, whereas certain crossed layers 19 are progressively terminated in the transition zone and other crossed layers 18 extend over the entire cross-section of the disc 11. FIG. 4 shows an example of the progressive evolution of the relative concentration, dimension and thicknesses, and of the relative positions of the crossed layers 18 and 19 and the aligned layers 15, 16 and 17.

The variation in the thickness of the stack forming the disc 11 that is brought about by progressive interruption of the crossed layers 19, and the disposition of the layers of cloth extending in different directions make it possible to achieve a rigidizing effect, which counters flapping, as well as longitudinal flexibility of the disc 11 in the direction in which the entrifugal force acts. In fact, the greater thickness of the laminated structure at the central portion 6, near which the limbs 12 are planar, than at its radial ends where the limbs 12 are narrower, ensures stiffening of the disc 11 to resist flapping and enables the latter to operate with little constraint. The crossed layers 18, 19 and 20, which are less strong and more flexible than the aligned layers 15, 16 and 17 as regards centrifugal forces, enable the disc 11 to become flexible as regards tensile load. Some layers of the upper and lower portions of the laminated structure, that are in the shape of a square or of a rhomb having rounded corners, extend radially outwards beyond the other layers so as to define an upper covering 21 and a lower covering 22 which together and with the rest of the laminated structure form a recess, open towards the exterior, in the end face of the radially outer end of each limb 12 of the disc 11, and a belt of parallel threads made of carbon fibres 23, which surrounds the disc 11, is pressed against the end face of the limbs 12 of the disc 11 and is accommodated in the recesses so formed. This belt 23 is constituted by a ribbon of laminated carbon threads, for example, or parallel threads consisting of fibres having high mechanical strength, such as glass fibres or those of the KEVLAR type, laid around the star-shaped disc 11. The spaces defined by the belt 23, the upper and lower coverings 21 and 22 respectively and two adjacent limbs 12 of the disc, are occupied by blocks 24 of a filler material which may be a foam substance having closed cells, so that, in plan, each plate has a shape which is a square or a rhomb with rounded corners, as illustrated in FIG. 2.

Referring again to FIG. 1, it will be seen that the identical upper and lower plates 2 and 3 respectively extend in planes which are substantially perpendicular to the axis A in which the rotor truns and that they are so arranged that the respective four limbs of the two plates 2 and 3 are precisely superposed, and that their flanged rings 14, in the position reversed from that illustrated in FIG. 3, are coaxial with each other.

A laminated spherical stop of known type, performing all of the functions of an articulation means for a rotor blade to handle its drag, flapping and incidence adjustment (for controlling the pitch) is indicated as a whole by the numeral 25, and is fitted between the ends 23 of each pair of superposed limbs 12 of the two plates 2 and 3. The construction of this laminated spherical stop 25 includes in particular its inner and outer radial attachments 26 and 27 respectively as well as the co-operation of its attachment with, respectively, a loop of parallel threads 28 comprising fibres of high mechanical strength forming part of the high-strength frame of the corresponding blade 29, and with two flanged anti-friction rings 30 at the ends of an aperture in the central sleeve 32 of the attachment 27. Two further flanged anti-friction rings 31 and the sleeve 32 form a cross-piece between the shoulder of one of the rings 14 and one of two support washers 33. A hollow metallic pin 34, passing through the rings 14, the washers 33, the rings 31 and the sleeve 32 holds the laminated spherical stop 25 between the ends of the superposed limbs 12 of the plates 2 and 3 and connects these together. This construction is described in detail in French Patent Application No. 81 22 027 filed on 25th November 1981. The present description will be confined to indicating that the flat head 35 of the pin 34 is held against the washer 33 by the pressure, exerted on the lower screw-threaded end of the non-rotatable pin 34, by a nut 36 secured by a peg, and that a stop 37 of known type and preferably retractable under the action of the centrifugal force, is fitted above (or below) the lower plate 3 and, in the operating position, co-operates with a bearing member 38 integral with the lower arm 39 of a pitch-control lever 40 when the rotor is stationary or is turning at low speed, so as to limit downward pivoting of the blade 29 under its own weight. Reference may also be made to the above-mentioned French Patent Application 81 22 027 as regards the construction of the means for supporting and fixing the loop 28 of parallel threads on the attachment 26, which means may comprise a flat member secured on the attachment 26 and holding the loop 28 of parallel threads in a seat in said attachment. The above-mentioned application may also be referred to for details of the construction of the blade 29, of the pitch-control lever 40, as well as a resilient drag-reaction brace (not illustrated), fitted between the lever 40 and the cross-piece 1 of the hub.

In the above-described hub, the forces applied to each plate 2 and 3 at, for example, the connection with the laminated spherical stop are distributed between the disc 11, consisting of cloth layers, and the belt of parallel threads 23, depending upon the relationship between the axial rigidities vis-a-vis the centrifugal forces and depending upon the rigidities for resisting bending under the flapping forces. Take-up of the couple and the transfer of the moments are mainly effected by the discs 11 of the two plates 2 and 3, part of the couple passing through the drag-reaction braces. The major part of the centrifugal forces is taken up by the belts 23 and they are balanced out in the latter without passing through the disc 11.

Figure 5:
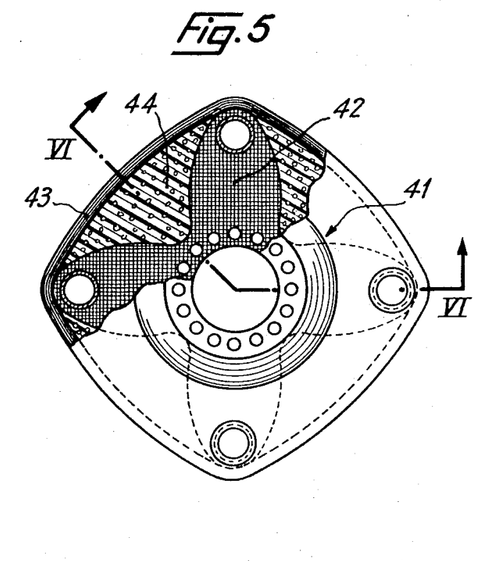
FIG. 5 is a view, similar to that of FIG. 2, of a second form of construction of a plate which may be used with a hub as shown in FIG. 1.
Figure 6:
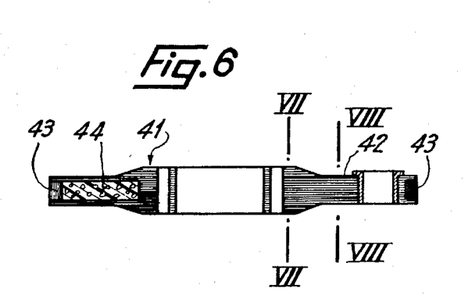
FIG. 6 is a section along the line VI—VI of FIG. 5.

FIGS. 5 to 8 illustrate a modified construction of the plates 2 and 3, in which construction are present similar components, made in the same manner and with the same constituent parts, only the shape being changed. The disc 41 again takes the form of a star having four limbs 42, but these are rounded. Similarly, the shape of the plate, in plan view, with its belt 43 of parallel threads and its blocks of filler material 44 is that of a square of a rhomb with rounded corners and slightly outwardly rounded sides as shown in FIG. 5. FIG. 6 shows that the thickness of the stack of layers of carbon fibre cloth forming the disc 41 is at its greatest at the central portion having upper and lower planar faces, and at its smallest in the peripheral portion, likewise having upper and lower planar faces and comprising the radial ends of the limbs 42. In this form of construction, however, the upper and lower planar faces of the central and peripheral portions are interconnected by two conical surfaces, the larger bases of which face each other.

Figure 7:
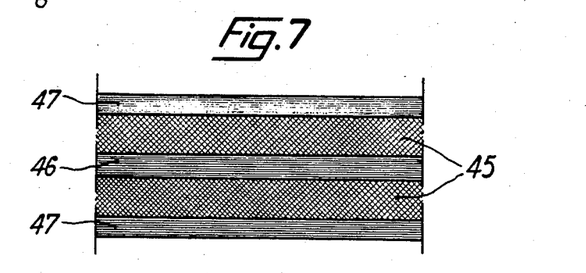
FIGS. 7 and 8 show diagrammatic transverse sections along the lines VII—VII and VIII—VIII respectively of FIG. 6.
Figure 8:
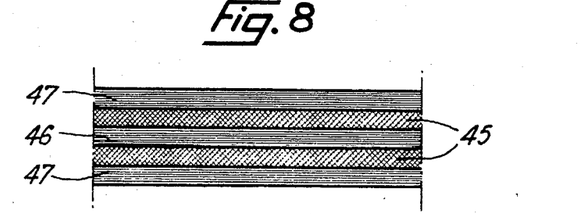

In FIGS. 7 and 8 it will be seen that the stack consists of two assemblages of crossed layers 45 each sandwiched between a central assemblage of aligned layers 46 and one of the two assemblages 47 of aligned layers at the upper and lower parts of the laminated structure, the thickness variation of which is achieved by varying the thickness of the assemblages of crossed layers 45.

Figures 9, 10, 11:
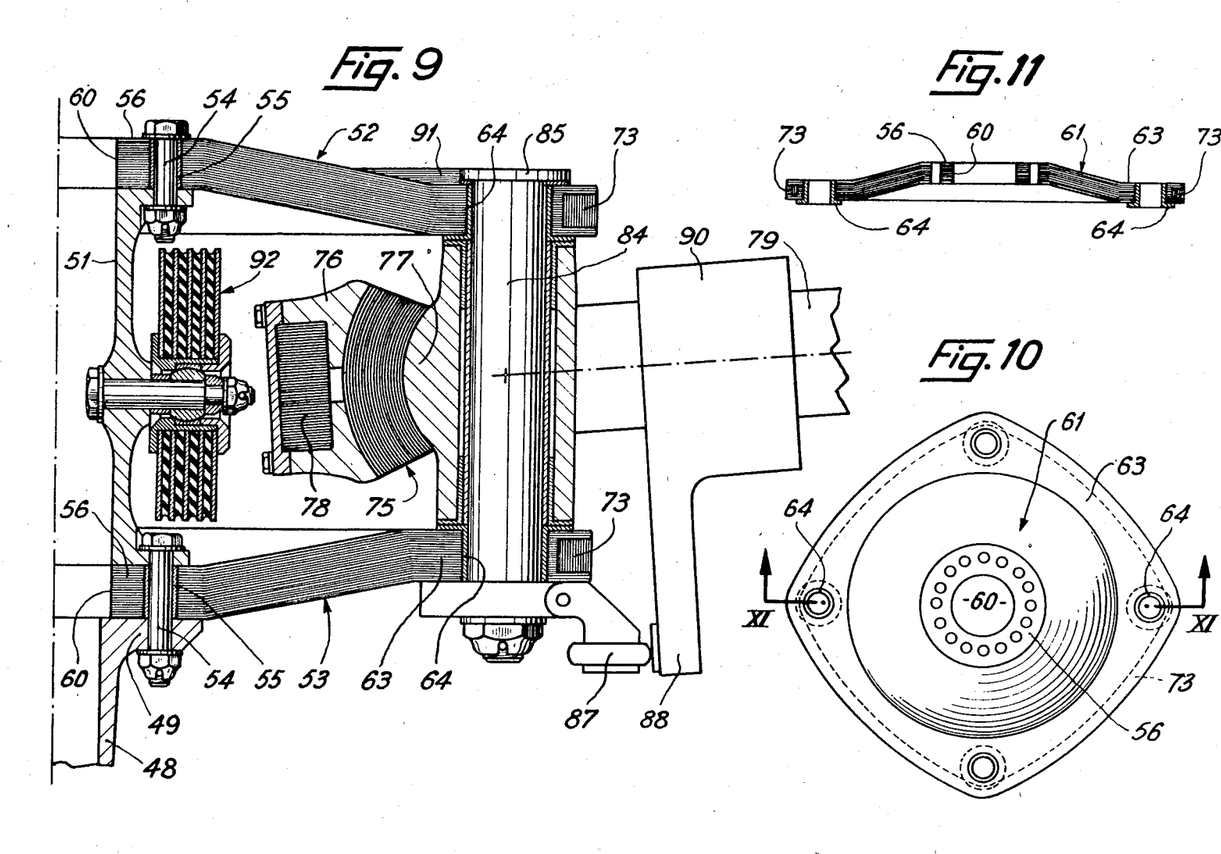
FIG. 9 is a view, similar to that of FIG. 1, of a second form of helicopter rotor hub provided with two plates having a third form of construction.
FIG. 10 is a plan view of the upper plate of the hub of FIG. 9.
FIG. 11 is a section along the line XI—XI of FIG. 10.

The second form of hub, illustrated in FIG. 9, is very similar to that of FIG. 1 and also is described in French Patent Application No. 81 22 027 referred to above. It comprises a one-piece tubular cross-piece 51 solidly connected, by means of nuts and bolts on the one hand, to the upper plate 52 and on the other hand, to the lower plate 53 and also to the upper end 49 of the rotor shaft 48 by means of openings having load-distribution rings 55 formed around the central opening 60 of the central circular portion 56 and at the upper and lower planar faces of the two plates 52 and 53.

Each of the plates 52 and 53 takes the form of a dish having a cross-section in the form of a square or of a rhomb with slightly outwardly rounded sides and rounded corners, said plates also each comprising a disc 61 having this same shape and surrounded by a belt 73 of parallel carbon threads which is contained in the outwardly open recesses formed in the end face of the disc 61. The rounded corners of the disc 61 are radially outwardly projecting parts of the peripheral portion 63 of the disc 61, and in each corner is formed an opening provided with a flanged ring 64 accommodating a single hollow pin 84 for connecting the upper plate 52 and the lower plate 53 to the radially outer attachment 77 of the laminated spherical stop 75 mounted in the loop 78 of parallel threads forming the frame of the blade 79.

Each disc 61 is constituted by a laminated structure with a substantially constant thickness of longitudinal crossed layers of carbon-fibre satin cloth, the central and peripheral portions 56 and 63 respectively of the laminated structure being interconnected by a frustoconical transition portion. The dished plates 62 and 63 are mounted on the hub in such manner that the cavity of each of them faces the other. Repetition of the description will be dispensed with as regards elements such as the low-placed retractable stop 87 co-operating with the bearing member 88 of the pitch-control lever 90, the mounting of the pin 84 and the device for fixing the loop 78 of parallel threads in the inner radial attachment 76 of the laminated spherical stop 75. However, it will be noted that a stop 91 may be provided on the upper plate 52, which stop is constituted by several pieces of laminated cloth co-operating with a flat machined on the widened flat head 85 of the pin 84 for preventing rotation of the latter. Also, there is illustrated, diagrammatically, a drag-reaction return brace 92, such as is described in the above-mentioned French Patent Application No. 81 22 027 and secured at its inner radial end to the central part of the cross-piece 51 by a ball-and-socket joint and a nut and bolt system.

In this construction, it is possible to envisage the use of KEVLAR cloth instead of carbon-fibre cloth, since KEVLAR has good mechanical properties (low density, high impact strength, good behaviour under tensile load), but because of its poor performance under compression, it is preferable to use carbon-fibre cloths for forming the discs of the plates which operate under bending forces.

Similarly, it is possible to envisage making the belt 73 of parallel glass threads, but carbon-fibre is preferred for making an element which should be very stiff in the longitudinal direction, so as to take up the main part of the centrifugal forces, since the use of glass-fibre is of interest only if there is a need for a lower ratio of elastic modulus to fatigue limit for producing parts that must undergo considerable deformation.

As regards the manufacture of plates, a simple and convenient method consists of the following successive stages:

placing, in a mould, a stack of layers of cloth consisting of fibres having high mechanical strength, after impregnation of the cloth with a synthetic resin and cutting each layer to the required shape, suitably compressing the stack in dependence upon the properties and qualities required in the plate, carrying out a first polymerization cycle so as to rigidize the stack so formed, removal of this stack from the mould, then winding or wrapping, respectively, around the edge of the stack, parallel threads or a ribbon of laminated threads consisting of fibres, preferably of carbon-fibre and having a high mechanical strength and impregnated with a synthetic resin, until a belt of laminated threads of the required thickness is formed, after possibly placing blocks of a filler material between the radially outwardly projecting parts of the stack, and in carrying out a second polymerization cycle, so as to bond the belt of parallel threads around the stack forming the disc.

It should be noted that, in the present description, the expression parallel threads means an assembly of basic threads, filaments or fibres having high mechanical strength and coated and agglomerated in parallel to form a bunch or ribbon, by means of a synthetic resin which is subsequently hardened.

Although the examples of hubs described by reference to the attached drawings concern hubs comprising two plates, the invention also covers hubs comprising only one plate formed in accordance with the invention.

What we claim is:

1. A hub plate for a helicopter rotor hub for securing to the top portion of a rotor hub at right angles to its axis of rotation so as to connect rotor blades to a rotor shaft, the plate being made of a composite material and comprising a laminated disc constituted by layers of fibre cloth having high mechanical strength, characterized in that frame of the disc is constituted by aligned layers of cloth, wherein the weft or the warp of the cloth extends radially in the direction that corresponds to the direction of the centrifugal force acting on the plate when in use, the aligned layers being positioned at the core of the laminated structure and, at least at the surface of the laminated structure in the peripheral portion of the disc, and in that the disc is enclosed by a belt of parallel threads consisting of fibres having high mechanical strength fitted on radially outwardly projecting parts of the disc in recesses formed in the outer edge of the parts, the recess being open to the exterior.

2. A hub plate, for a hub of a helicopter rotor including a rotor shaft rotating around a rotor rotation axis and at least two rotor blades connected to said shaft by means of said hub, the plate being securable to a top portion of said shaft, at right angles to said rotation axis, and being made of a composite material, said plate comprising a laminated disc constituted, by a stacking of layers of fibre cloth made with fibres having high mechanical strength and which are impregnated with a synthetic resin, and, by an agglomerate of substantially parallel fibres having high mechanical strength and also impregnated with a synthetic resin, wherein said disc has an inner part constituted by said stacking of layers of fibre cloth and comprising a central portion with planar faces and with a ring of holes extending perpendicularly to said planar faces for housing bolts securing said plate to said shaft, and a peripheral portion also with planar faces and with apertures extending perpendicularly to said planar faces for housing connecting means connecting said blades to said plate;

said disc having a generally polygonal and convex outer shape with sides and apices equal in number to the number of said blades, each of said aperture being centered in said peripheral portion on an axis joining the disc center to an apex of said polygonal shape;

said disc having a substantially polygonal outer edge extending perpendicularly to the plane of said disc, said disc having further an upper and a lower portions with surface coverings each formed by several layers of fibre cloth and presenting an outer shape extending slightly beyond said outer polygonal edge so as to define with the latter a peripheral recess which is open towards the exterior, and wherein said disc is surrounded by a belt of parallel threads of fibres having high mechanical strength, said belt being held against said outer edge of said disc and completely filling said peripheral recess.

3. A hub plate according to claim 2, wherein the disc has the shape of a star having limbs equal in number to the number of said blades, each limb of the star forming a radially outwardly projecting part which has at least one of said apertures and which is wider towards the central portion of the disc than at its radially outer end, and wherein each pair of two adjacent limbs, the belt of parallel threads, and said surface coverings of said upper and lower disc portions define between them a space which is occupied by a filler material such as a foam substance having closed cells.

4. A hub plate according to claim 2, characterized in that the disc having a polygonal shape, has sides which are slightly rounded or domed radially towards the exterior, and of which the rounded vertices constitute the radially outwardly projecting parts.

5. A hub plate according to claim 4, characterized in that the disc is of dished shape such that a central circular portion of the disc is connected to a peripheral portion by at least one substantially tapered portion.

6. A hub plate according to any one of claims 3 to 5 or 2, characterized in that the thickness of the disc is substantially constant and greater than the vertical dimension of the belt of parallel threads.

7. A hub plate according to any one of claims 3 to 5 or 2, characterized in that the disc has a variable thickness which is greatest in the central portion.

8. A hub plate according to claim 7, characterized in that the central portion of the disc has one planar face which is connected by a conical surface to a corresponding face of the peripheral portion which is also planar, and wherein the other face of the disc is planar.

9. A hub plate according to claim 7, characterized in that the central portion of the disc has two planar faces each of which is connected to a corresponding planar face of the peripheral portion by a conical surface, such that larger face of each conical surface faces the other conical surface.

10. A hub plate according to any one of claims 3 to 5 or 2, characterized in that the layers of cloth of the laminated disc are disposed in different directions.

11. A hub plate according to any one of claims 3 to 5 or 2, characterized in that the fibre cloth used for forming the laminated disc is a satin cloth, the properties of which are identical in the directions of the weft and warp.

12. A hub plate according to any one of claims 3 to 5 or 2, characterized in that the laminated structure includes crossed layers of cloth, the weft and warp of which is arranged at an angle relative to the radial direction of the centrifugal force applied to the plate when in use, the crossed layers being located at the core of the laminated structure.

13. A hub plate according to claim 12 in which the thickness of the disc is variable, characterized in that certain of the crossed layers are terminated progressively with increasing radial distance from the central portion so as to provide the required variation in thickness.

14. A hub plate according to any one of claims 3 to 5 or 2, characterized in that the belt of parallel threads is formed by a ribbon of laminated threads, which is previously impregnated with a synthetic resin, arranged around the disc and then polymerized.

15. A hub plate according to any one of claims 3 to 5 or 2, characterized in that the belt of parallel threads is formed by an agglomerate of parallel threads, previously impregnated with a synthetic resin, wound around the disc and then polymerized.

16. A hub plate according to any one of claims 3 to 5 or 2, wherein said high-strength fibres of said fibre cloth and of said parallel fibres of said belt are carbon-fibre.

17. A helicopter rotor hub including at least one plate as claimed in any one of 3, 4, 5, or 2.

18. A helicopter rotor hub including a lower plate and an upper plate which are coaxial and separated by a cross-piece, characterized in that each of the plates is as set forth in claim 5, and the cavity in the dish shaping of each plate faces the other plate, each of the plates being secured by its central portion to the cross-piece and the lower plate is further secured to the upper end of a rotor shaft.

19. A helicopter rotor hub comprising a lower plate and an upper plate which are coaxial and are separated by a cross-piece, characterized in that each of the plates is a plate according to claim 3 and the central portion of each disc has one planar face connected by a conical surface to a corresponding face of the peripheral portion which is also planar and the other face of each disc is also planar.

20. A hub according to claim 18 or 19, characterized in that the radially outwardly projecting and superposed parts of the two plates each has a single hole for attachment to a corresponding rotor blade, this hole being provided with at least one flanged ring designed to receive a pin for retaining a device for connection to the base of the corresponding rotor blade.

21. A hub plate according to any one of claims 3 to 5 or 2, wherein said disc has a frame part constituted by aligned layers of fibre cloth the weft or the warp of which extends radially in the direction of the centrifugal forces transmitted from said rotor blades to said plate, said aligned layers being located in the cone of said stacking of fibre cloth layers and, at least in said peripheral portion, at the surface of said stacking.

* * * * *